United States Patent
Schleicher

(10) Patent No.: US 10,071,681 B2
(45) Date of Patent: Sep. 11, 2018

(54) METHOD FOR WARNING A VEHICLE DRIVER OF A TAILGATING THIRD PARTY VEHICLE

(71) Applicant: Robert Bosch GmbH, Stuttgart (DE)

(72) Inventor: Roman Schleicher, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/774,033

(22) PCT Filed: Feb. 11, 2014

(86) PCT No.: PCT/EP2014/052615
§ 371 (c)(1),
(2) Date: Sep. 9, 2015

(87) PCT Pub. No.: WO2014/139742
PCT Pub. Date: Sep. 18, 2014

(65) Prior Publication Data
US 2016/0016509 A1      Jan. 21, 2016

(30) Foreign Application Priority Data
Mar. 11, 2013   (DE) .................. 10 2013 204 076

(51) Int. Cl.
*B60Q 1/00*     (2006.01)
*B60Q 1/52*     (2006.01)
(Continued)

(52) U.S. Cl.
CPC .............. *B60Q 1/525* (2013.01); *B60Q 1/46* (2013.01); *B60Q 5/006* (2013.01);
(Continued)

(58) Field of Classification Search
CPC ....................................................... G08G 1/00
(Continued)

(56) References Cited

U.S. PATENT DOCUMENTS

| | | | |
|---|---|---|---|
| 2007/0021915 A1* | 1/2007 | Breed ................. | B60N 2/2863 701/301 |
| 2007/0040664 A1 | 2/2007 | Johnson et al. | |

(Continued)

FOREIGN PATENT DOCUMENTS

| | | |
|---|---|---|
| CN | 101427287 A | 5/2009 |
| CN | 102795184 A | 11/2012 |

(Continued)

*Primary Examiner* — Daryl Pope
(74) *Attorney, Agent, or Firm* — Norton Rose Fulbright US LLP; Gerard Messina

(57) ABSTRACT

A method for warning a vehicle driver of a third party vehicle, in particular of a motor vehicle, of a collision, the vehicle driver of the driving third party vehicle being warned by the host vehicle of an imminent collision with a correspondingly front host vehicle, and the vehicle driver of the tailgating third party vehicle is signaled the imminent collision with the host vehicle by a driver assistance system of the host vehicle. Also described is a computer program product, an arithmetic unit, or a processing device, which may be a control device or a control unit for a vehicle, as well as to a driver assistance system for a vehicle, in particular a motor vehicle.

17 Claims, 1 Drawing Sheet

(51) Int. Cl.
  *G08G 1/16* (2006.01)
  *B60Q 1/46* (2006.01)
  *B60Q 5/00* (2006.01)
  *B60W 50/00* (2006.01)
  *B60W 50/14* (2012.01)
(52) U.S. Cl.
  CPC ........ *B60W 50/0097* (2013.01); *B60W 50/14* (2013.01); *G08G 1/166* (2013.01)
(58) Field of Classification Search
  USPC .................... 340/901–905, 937, 435–436
  See application file for complete search history.

(56) References Cited

U.S. PATENT DOCUMENTS

| | | | | |
|---|---|---|---|---|
| 2007/0296564 | A1* | 12/2007 | Howell | B60Q 1/525 340/435 |
| 2011/0298603 | A1* | 12/2011 | King | G08G 1/164 340/436 |
| 2012/0083960 | A1* | 4/2012 | Zhu | G05D 1/0214 701/23 |
| 2016/0093121 | A1* | 3/2016 | Singh | G07C 5/008 701/32.3 |

FOREIGN PATENT DOCUMENTS

| | | |
|---|---|---|
| DE | 103 28 755 | 7/2004 |
| DE | 10 2004 062497 | 7/2006 |
| DE | 10 2005 059688 | 6/2007 |
| DE | 2010 027952 | 12/2011 |

\* cited by examiner

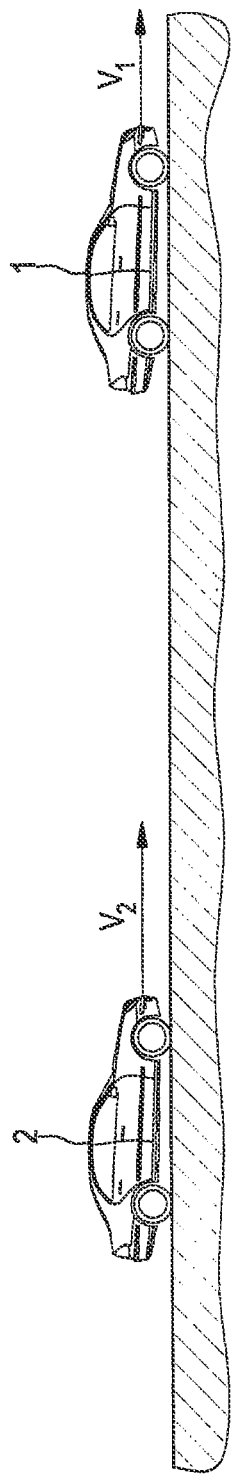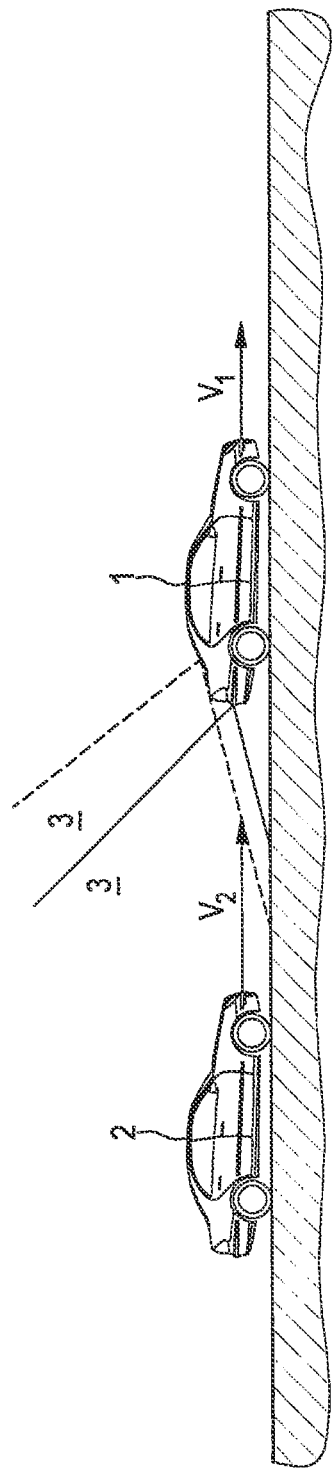

METHOD FOR WARNING A VEHICLE DRIVER OF A TAILGATING THIRD PARTY VEHICLE

FIELD OF THE INVENTION

The present invention relates to a method for warning a vehicle driver of a third party vehicle, in particular of a motor vehicle, of a collision. Furthermore, the present invention relates to a computer program product, an arithmetic unit, or a processing device, which may be a control device or a control unit for a vehicle, as well as a driver assistance system for a vehicle, in particular a motor vehicle.

BACKGROUND INFORMATION

The driver assistance systems for motor vehicles which are presently available on the market warn a vehicle driver and/or trigger suitable measures, e.g., pre-safe measures, which concern one's own vehicle, i.e., the vehicle having the driver assistance system.—One's own vehicle having the driver assistance system is in most cases referred to in the following as the host vehicle or also as the front or the preceding vehicle. A relevant second vehicle is in most cases referred to as a third party vehicle or also as a rear or a rapidly approaching vehicle.

By using a rear-end sensor system of the host vehicle, i.e., the front of the two vehicles which are directly adjacent to one another, the driver of the host vehicle is, for example, warned, in the case of a possible collision in a blind spot range, of the possibility of a tailgating third party vehicle. The third party vehicle or the tailgating (third party) vehicle driver is not warned if the vehicle which is about to cause a rear-end collision does not have any technical possibilities at its disposal to do so, i.e., if it does not have a driver assistance system.

SUMMARY OF THE INVENTION

It is an object of the present invention to provide an improved method for warning a vehicle driver of a tailgating third party vehicle. Furthermore, it is the object of the present invention to accordingly provide a computer program product, an arithmetic unit, or a processing device as well as a driver assistance system for a vehicle. For this purpose, it should be possible to warn the third party vehicle of a rear-end collision only with the aid of a vehicle, the host vehicle, which is located in front of the third party vehicle, without the two vehicles exchanging information with one another. In this case, the method is supposed to be applicable to third party vehicles without a driver assistance system.

The object of the present invention is achieved with the aid of a method for warning a vehicle driver of a third party vehicle, in particular of a motor vehicle, of a collision as described herein; with the aid of a computer program product as described herein; with the aid of an arithmetic unit or a processing device, which may be a control device or a control unit for a vehicle, in particular a motor vehicle, as described herein; and with the aid of a driver assistance system for a vehicle, in particular a motor vehicle, as described herein. Advantageous refinements, additional features and/or advantages of the present invention result from the following description.

In the case of the method for collision warning according to the present invention a third party vehicle driver of a driving third party vehicle is warned by the host vehicle itself of an imminent collision with the host vehicle, in particular a motor vehicle, which is directly in front of the third party vehicle. According to the present invention, the (third party) vehicle driver of the tailgating third party vehicle is signaled about the imminent collision with the host vehicle by a driver assistance system of the host vehicle. For this purpose, the host vehicle is the vehicle which is located in a driving direction of the third party vehicle in front of the third party vehicle. The host vehicle may in this case be driving, standing, or standing still. The imminent collision between the two vehicles is an imminent rear-end collision.

In the specific embodiments of the present invention, a piece of information about the imminent collision which may be signaled to the (third party) vehicle driver of the tailgating third party vehicle is generated by the driver assistance system of the host vehicle. In this case, the piece of information about the imminent collision of the two vehicles—i.e., of the rear, second vehicle, the tailgating third party vehicle with the front, first vehicle, the host vehicle— may in particular come from an environmental or a surroundings sensor system of the driver assistance system of the host vehicle. In particular, this may be ascertained by a rear-end sensor system of the environmental or surroundings sensor system of the driver assistance system of the host vehicle. For this purpose, the rear-end sensor system includes a rear-end radar, an ultrasonic sensor system and/or a near-field video sensor system.

In specific embodiments of the present invention, the collision warning method or the driver assistance system of the host vehicle outputs in the case of an imminent collision a visual and/or an acoustic signal to the (third party) vehicle driver of the third party vehicle which is about to cause a rear-end collision. The visual signal, which signals the imminent collision between the vehicles, may be a lighting up, a blinking, a flashing or a permanent lighting up of a rear-end illuminant of the host vehicle. During this time period, the host vehicle may prepare and, if necessary, take pre-safe measures.

In specific embodiments of the present invention, the collision warning method according to the present invention or the driver assistance system according to the present invention may, in the case of an already illuminated rear-end illuminant, in particular an already illuminated braking illuminant, of the host vehicle furthermore make this rear-end illuminant blink or flash comparably rapidly. Moreover, the visual signal which indicates the imminent collision between the vehicles may be a lighting up, a blinking, a flashing or a permanent lighting up of a signal and/or a text on a rear end or a rear window of the host vehicle.

According to the present invention, the displayed signal of the imminent collision between the vehicles is not an electrical or an electro-optical, but an acoustic or a visual signal. This signal may be in particular a red, possibly blinking or flashing, visible light which may have a high intensity so that the third party vehicle driver rapidly becomes aware of it. The rear-end illuminant of the host vehicle used for this purpose may be a braking light, a rear fog light, a flashing light or a backing-up light. Other lights, signals or displays which are reflected into the rear window are naturally also applicable.

According to the present invention, if a possible collision of the third party vehicle with the host vehicle is detected, the tailgating third party vehicle may be warned by the preceding host vehicle, whereby the third party vehicle driver may take measures in order to prevent an imminent collision. This is important, in particular, for (third party) vehicle drivers whose vehicles do not have a driver assistance system; these vehicle drivers benefit from the investment of the vehicle driver of the host vehicle, so that accidents may be prevented.

This means that the two vehicles do not have to exchange information with one another in order to increase the accident safety. The information about the imminent collision is transmitted by the driver assistance system of the host vehicle directly to the third party vehicle driver and not to the third party vehicle.

The computer program product according to the present invention having a program code arrangement is configured in such a way that a collision warning method according to the present invention may be carried out and is carried out when the program code arrangement run on a processing device or are stored on a computer-readable data carrier. This means that the computer program product according to the present invention, e.g., a computer program, includes a program code, the program code arrangement, to carry out or execute the collision warning method according to the present invention. In this case, the computer program may be executed on a computer or may be stored on a data carrier such as a memory chip or a hard drive. The computer program product according to the present invention may in this case be an integral part of the driver assistance system of the vehicle, for example.

The arithmetic unit according to the present invention or the processing device according to the present invention, which may be the control device or the control unit, is configured in such a way that a collision warning method according to the present invention may be carried out and/or the computer program product according to the present invention may be processed by the arithmetic unit or the processing device. The arithmetic unit or the processing device is, for example, configured as an electronic arithmetic unit, e.g., as a computer, which may naturally also carry out and/or execute other tasks.

The driver assistance system according to the present invention for a vehicle, in particular a motor vehicle, is configured in such a way that it is able to carry out a collision warning method according to the present invention. Furthermore, the driver assistance system according to the present invention may additionally or alternatively include a computer program product according to the present invention and/or an arithmetic unit or a processing device according to the present invention.

The present invention is described in greater detail in the following on the basis of the exemplary embodiments with reference to the appended drawing. The schematic figures of the drawings are not true to scale.

BRIEF DESCRIPTION OF THE DRAWINGS

FIG. 1 shows in a side view a rear vehicle which is approaching a front vehicle comparably rapidly, a sufficient safety distance remaining between the two vehicles.

FIG. 2 shows a view which is analog to FIG. 1, the approaching rear vehicle having overcome a critical distance between the two vehicles and the front vehicle outputting a collision warning according to the present invention to the rear vehicle.

DETAILED DESCRIPTION

The present invention is elucidated below in greater detail based on a plurality of specific embodiments. The present invention is, however, not limited to these specific embodiments, but includes a plurality of specific embodiments, it being possible according to the present invention that a vehicle, in particular a motor vehicle, without a driver assistance system—in the following this is vehicle 2 having speed $v_2$, in most cases referred to as third party vehicle 2—is warned by a vehicle having a driver assistance system—in the following this is vehicle 1 having speed $v_1$, in most cases referred to as host vehicle 1—of an imminent collision.

A problem case from the related art which may be handled significantly better according to the present invention and which relates to a standing host vehicle is used as a starting point. The present invention is naturally also applicable to driving host vehicles as is also elucidated in greater detail based on FIGS. 1 and 2.

The host vehicle is at a standstill according to the related art. A driver of a third party vehicle which is driving toward the host vehicle is distracted. The third party vehicle is not equipped with an environmental sensor system and is not able to warn its own vehicle driver of the imminent rear-end collision. The host vehicle having the environmental sensor system is able to detect the imminent collision and initiate all the necessary measures for the host vehicle. However, the host vehicle is not able to prevent a collision. Furthermore, the host vehicle is not able to warn the driver of the third party vehicle of the imminent collision.

In the exemplary embodiments of the present invention elucidated according to FIGS. 1 and 2, host vehicle 1 is slower than third party vehicle 2, wherein the following applies: $v_2 > v_1 \geq 0$, i.e., faster third party vehicle 2 causes a rear-end collision with slower host vehicle 1. Here, host vehicle 1 may be driving, standing, e.g., waiting at a traffic light, or be at a standstill, e.g., parking. To carry out the method according to the present invention, the two vehicles 1, 2 are at least partially situated behind one another, a lateral offset being possible between vehicles 1, 2 (not illustrated in the drawing).

FIG. 1 represents a situation which is at first unproblematic for either vehicle 1, 2. Third party vehicle 2 has a sufficient safety distance with regard to host vehicle 1, but it is approaching host vehicle 1 at a relative speed of $v_2 - v_1$ (see speed vectors in FIGS. 1 and 2). In FIG. 2, a safety distance, which may be a function of driving speed $v_2$ of third party vehicle 2 and/or of driving speed $v_1$ ($v_1 \geq 0$) of host vehicle 1, between the two vehicles 1, 2 is fallen below. If the minimum safety distance is fallen below, it may be assumed with a certain degree of probability that third party vehicle 2 rapidly approaches host vehicle 1 and drives into its rear end, i.e., could cause a crash.

A rear-end sensor system of an environmental or a surrounding sensor system of the driver assistance system of host vehicle 1, e.g., a rear-end radar, an ultrasonic sensor system and/or a near-field video sensor system, etc., ascertains a distance between third party vehicle 2 and host vehicle 1, a speed $v_2$ of vehicle 2, a speed $v_1$ of vehicle 1 and/or a relative speed $v_2 - v_1$, etc., and ascertains therefrom whether an imminent collision of the two vehicles 2, 1 may be present. If this is the case with a certain or comparably high degree of probability, a vehicle driver 2 of third party vehicle 2 is displayed the imminent collision with host vehicle 1 by the driver assistance system of host vehicle 1.

This may take place using a purely acoustic signal 3 and/or a purely visual signal 3 of host vehicle 1 or its driver assistance system, signal 3 being transmitted directly without a detour to the senses of vehicle driver 2 of third party vehicle 2. This means that warning signal 3 does not go via a (electronically coded=>electromagnetically coded=>electronically coded=>visual/acoustic) communication from host vehicle 1 to third party vehicle 2 and third party vehicle driver 2, i.e., there is no "car-to-car communication" (vehicle-to-vehicle communication) of any kind, but rather a "car-to-driver communication" (electronically coded=>acoustic/visual).—If third party vehicle 2 is in the range of an imminent collision with host vehicle 1, host vehicle 1 is able to prepare, initiate and/or take pre-safe measures. These pre-safe measures may be reversible.

In addition to a shrill acoustic alert 3, which possibly increases and reduces its intensity, visual signals 3 may be used which may be implemented using presently customary on board arrangements. In this way, the imminent collision between vehicles 2, 1 may be signaled by a lighting up, a blinking, a flashing or a permanent lighting up of a rear-end illuminant of host vehicle 1. A rear-end illuminant of this type may be a braking light, a rear fog light, a flashing light or a backing-up light. In the case of a chronologically already illuminated rear-end illuminant, in particular an already illuminated braking illuminant, the rear-end illuminant may start blinking or flashing rapidly. Furthermore, a lighting up, a blinking, a flashing, or a permanent lighting up of a signal and/or a text on a rear end or a rear window of the host vehicle may be used.

The smaller the distance becomes, possibly as a function of a speed $v_1$, $v_2$, $v_2-v_1$ of one and/or both vehicle(s) 2, 1, the more illuminants may light up and/or the shorter a blinking frequency of the illuminants may become. Furthermore, the illuminants may also beam more brightly or flashy. If the distance becomes critical or very critical, i.e., if a crash is imminent or immediately imminent, it is possible to use a distance of host vehicle 1 available at the front. This may take place, if necessary, by automatically accelerating or reducing a braking delay of host vehicle 1.

A measure for a critical distance for an imminent collision of the two vehicles 2, 1 may be, for example, a stopping or braking distance at a relative speed $v_2-v_1$ of vehicles 2, 1 taking into consideration the road surface, weather, and a downhill or an uphill grade, if necessary. This means that the two vehicles 2, 1 should be/drive at such a distance from one another that an individual vehicle having an absolute speed, which corresponds to above-mentioned relative speed $v_2-v_1$, comes to a stop locally before a corresponding obstacle.

Since third party vehicle driver 2 pays more or less attention, the critical distance for the stopping distance may be deviated by the following factors: −30%, −25%, −20%, −15%, −10%, −5%, ±0%, +5%, +10%, +15%, +20%, +25%, +30%±approximately 2, 5%. Analog factors for the braking distance are: ±0%, +10%, +20%, +30%, +40%, +50%, +60%, +70%, +80%, +90%, +100%±approximately 5%. In the case of high relative speeds $v_2-v_1$, in particular, it is recommended to warn vehicle driver 2 of approaching third party vehicle 2 comparably early chronologically, whereby she/he is communicated accordingly early a piece of information about a speed of host vehicle 1 and she/he does not miscalculate this speed.

What is claimed is:

1. A method for warning a vehicle driver of a third party vehicle of a collision, the method comprising:
   warning a vehicle driver of a driving third party vehicle by a host vehicle of an imminent rear-end collision with the host vehicle while the host vehicle is driving in front of the third party vehicle and while the third party vehicle is tailgating the host vehicle; wherein the warning includes signaling, via a driver assistance system of the host vehicle, the vehicle driver of the third party vehicle, which is about to cause the rear-end collision, of the imminent rear-end collision with the host vehicle, wherein;
   the driver assistance system of the host vehicle outputs in the case of the imminent rear-end collision a visual signal to the vehicle driver of the tailgating third party vehicle,
   the visual signal, which signals the imminent rear-end collision between the vehicles, includes a lighting up, a blinking, a flashing or a permanent lighting up of a rear-end illuminant of the host vehicle, and
   as the third party vehicle comes closer to the host vehicle while a speed of at least one of the third party vehicle and the host vehicle is above a threshold, the host vehicle one of:
      activates a further rear-end illuminant of the host vehicle,
      increases a frequency of a flashing of the rear-end illuminant, and
      increases a brightness of the lighting up of the rear-end illuminant.

2. The collision warning method of claim 1, wherein a piece of information about the imminent rear-end collision to be signaled to the vehicle driver of the third party vehicle which is about to cause a rear-end collision is generated by the driver assistance system of the host vehicle.

3. The collision warning method of claim 1, wherein the driver assistance system of the host vehicle outputs in the case of the imminent rear-end collision an acoustic signal to the vehicle driver of the tailgating third party vehicle and/or the host vehicle prepares and, if necessary, takes pre-safety measures.

4. The collision warning method of claim 1, wherein if a rear-end illuminant of the host vehicle is already illuminated, the rear-end illuminant starts blinking or flashing comparably rapidly.

5. The collision warning method of claim 1, wherein the visual signal includes a text on a rear end of a rear window of the host vehicle.

6. The collision warning method of claim 1, wherein at least one the following is satisfied:
   in the case of the imminent rear-end collision between the vehicles, the signal is not an electrical or an electro-optical signal,
   the host vehicle drives, stands or stands still,
   the rear-end illuminant of the host vehicle includes a braking light, a rear fog light, a flashing light or a backing-up light,
   the imminent rear-end collision is ascertained based on a rear-end sensor system of the environmental or surroundings sensor system of the driver assistance system of the host vehicle, and
   the rear-end sensor system of the driver assistance system of the host vehicle includes at least one of a rear-end radar, an ultrasonic sensor system, and a near-field video sensor system.

7. A computer readable data carrier having a computer program, which is executable by a processor, comprising:
   a program code arrangement having program code for warning a vehicle driver of a third party vehicle of a collision, by performing the following:
   warning a vehicle driver of a driving third party vehicle by a host vehicle of an imminent rear-end collision with the host vehicle while the host vehicle is driving in front of the third party vehicle and while the third party vehicle is tailgating the host vehicle, wherein the warning includes signaling, via a driver assistance system of the host vehicle, the vehicle driver of the third party vehicle, which is about to cause the rear-end collision, of the imminent rear-end collision with the host vehicle, wherein;

the driver assistance system of the host vehicle outputs in the case of the imminent rear-end collision a visual signal to the vehicle driver of the tailgating third party vehicle, the visual signal, which signals the imminent rear-end collision between the vehicles, includes a lighting up, a blinking, a flashing or a permanent lighting up of a rear-end illuminant of the host vehicle, and as the third party vehicle comes closer to the host vehicle while a speed of at least one of the third party vehicle and the host vehicle is above a threshold, the host vehicle one of:

activates a further rear-end illuminant of the host vehicle, increases a frequency of the flashing of the rear-end illuminant, and increases a brightness of the lighting up of the rear-end illuminant.

8. A control device or a control unit for a vehicle for warning a vehicle driver of a third party vehicle of a collision, comprising:

an arrangement for warning a vehicle driver of a driving third party vehicle by a host vehicle of an imminent rear-end collision with the host vehicle while the host vehicle is driving in front of the third party vehicle and while the third party vehicle is tailgating the host vehicle, wherein the warning includes signaling, via a driver assistance system of the host vehicle, the vehicle driver of the third party vehicle, which is about to cause the rear-end collision, of the imminent rear-end collision with the host vehicle, wherein;

the driver assistance system of the host vehicle outputs in the case of the imminent rear-end collision a visual signal to the vehicle driver of the tailgating third party vehicle, the visual signal, which signals the imminent rear-end collision between the vehicles, includes a lighting up, a blinking, a flashing or a permanent lighting up of a rear-end illuminant of the host vehicle, and as the third party vehicle comes closer to the host vehicle while a speed of at least one of the third party vehicle and the host vehicle is above a threshold, the host vehicle one of:

activates a further rear-end illuminant of the host vehicle, increases a frequency of the flashing of the rear-end illuminant, and increases a brightness of the lighting up of the rear-end illuminant.

9. A driver assistance system for a vehicle, comprising:
a computer readable medium having a computer program, which is executable by a processor, including a program code arrangement having program code for warning a vehicle driver of a third party vehicle of a collision, by performing the following:

warning a vehicle driver of a driving third party vehicle by a host vehicle of an imminent rear-end collision with the host vehicle while the host vehicle is driving in front of the third party vehicle and while the third party vehicle is tailgating the host vehicle, wherein the warning includes signaling, via the driver assistance system of the host vehicle, the vehicle driver of the third party vehicle, which is about to cause the rear-end collision, of the imminent rear-end collision with the host vehicle, wherein;

the driver assistance system of the host vehicle outputs in the case of the imminent rear-end collision a visual signal to the vehicle driver of the tailgating third party vehicle, the visual signal, which signals the imminent rear-end collision between the vehicles, includes a lighting up, a blinking, a flashing or a permanent lighting up of a rear-end illuminant of the host vehicle, and as the third party vehicle comes closer to the host vehicle while a speed of at least one of the third party vehicle and the host vehicle is above a threshold, the host vehicle one of:

activates a further rear-end illuminant of the host vehicle, increases a frequency of the flashing of the rear-end illuminant, and increases a brightness of the lighting up of the rear-end illuminant.

10. The collision warning method of claim 1, wherein a piece of information about the imminent rear-end collision to be signaled to the vehicle driver of the third party vehicle which is about to cause a rear-end collision is generated by the driver assistance system of the host vehicle, and wherein the piece of information about the imminent rear-end collision comes from an environmental or a surroundings sensor system of the driver assistance system of the host vehicle.

11. The collision warning method of claim 1, wherein in the case of an already illuminated rear-end illuminant, which is an already illuminated braking illuminant, of the host vehicle, the rear-end illuminant starts blinking or flashing comparably rapidly.

12. The collision warning method of claim 1, wherein the third party vehicle lacks a driver assistance system so that no exchange of information occurs between the third party vehicle and the host vehicle.

13. The collision warning method of claim 1, wherein the warning is transmitted one of visually and acoustically directly to the driver of the third party vehicle.

14. The collision warning method of claim 1, wherein if a distance between the host vehicle and the third party vehicle reaches a critical value while the speed of at least one of the third party vehicle and the host vehicle is above the threshold, the driver assistance system of the host vehicle one of automatically accelerates the host vehicle and automatically decreases a braking force if a brake is actuated.

15. The computer readable medium of claim 7, wherein if a distance between the host vehicle and the third party vehicle reaches a critical value while the speed of at least one of the third party vehicle and the host vehicle is above the threshold, the driver assistance system of the host vehicle one of automatically accelerates the host vehicle and automatically decreases a braking force if a brake is actuated.

16. The control device or the control unit of claim 8, wherein if a distance between the host vehicle and the third party vehicle reaches a critical value while the speed of at least one of the third party vehicle and the host vehicle is above the threshold, the driver assistance system of the host vehicle one of automatically accelerates the host vehicle and automatically decreases a braking force if a brake is actuated.

17. The driver assistance system of claim 9, wherein if a distance between the host vehicle and the third party vehicle reaches a critical value while the speed of at least one of the third party vehicle and the host vehicle is above the threshold, the driver assistance system of the host vehicle one of automatically accelerates the host vehicle and automatically decreases a braking force if a brake is actuated.

* * * * *